W. H. BOUTELL.
FRUIT HANDLING MACHINE.
APPLICATION FILED JAN. 25, 1911.

1,026,299.

Patented May 14, 1912.
3 SHEETS—SHEET 2.

Witnesses
Walter B. Payne
Nilson Copp

Inventor
William H. Boutell
By
Attorney

W. H. BOUTELL.
FRUIT HANDLING MACHINE.
APPLICATION FILED JAN. 25, 1911.
1,026,299.
Patented May 14, 1912.
3 SHEETS—SHEET 3.
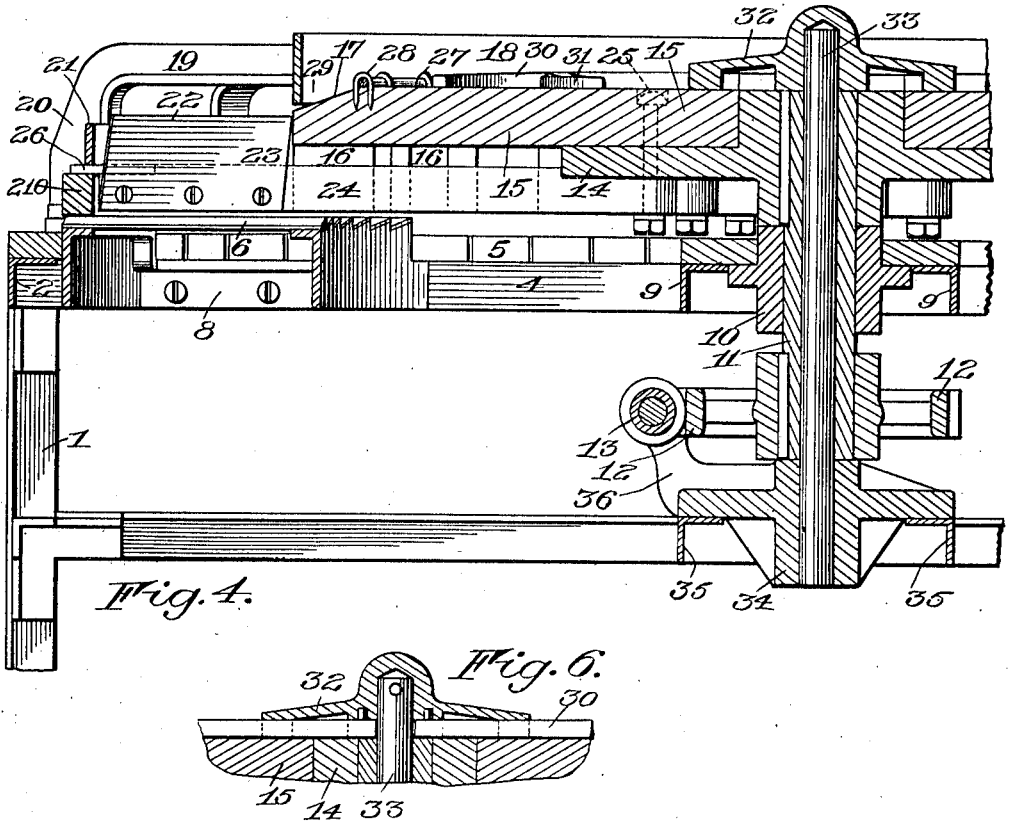
Fig. 4.
Fig. 6.
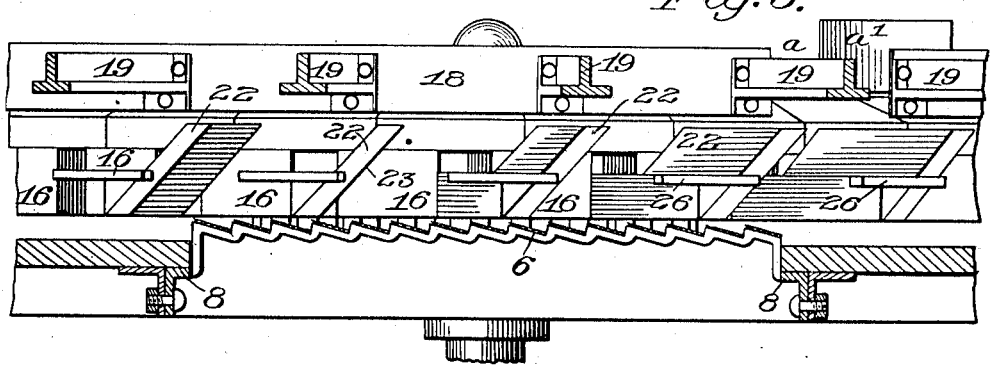
Fig. 5.
Witnesses
Walter B. Payne
Nelson Copp
Inventor
William H. Boutell
By Frederick S. Church
Attorney

UNITED STATES PATENT OFFICE.

WILLIAM H. BOUTELL, OF ROCHESTER, NEW YORK, ASSIGNOR TO BOUTELL MANUFACTURING CO., OF ROCHESTER, NEW YORK, A CORPORATION OF NEW YORK.

FRUIT-HANDLING MACHINE.

1,026,299.  Specification of Letters Patent.  Patented May 14, 1912.

Application filed January 25, 1911. Serial No. 604,640.

*To all whom it may concern:*

Be it known that I, WILLIAM H. BOUTELL, of Rochester, in the county of Monroe and State of New York, have invented certain new and useful Improvements in Fruit-Handling Machines; and I do hereby declare the following to be a full, clear, and exact description of the same, reference being had to the accompanying drawings, forming a part of this specification, and to the reference-numerals marked thereon.

My present invention relates to machines adapted particularly for operating upon fruit and has for its object to provide an apparatus for handling or separating fruit or other objects in bulk whereby the separate pieces may be sorted out singly and successively presented to the associated parts of the mechanism provided to perform other operations upon them.

My invention has for its further object to provide a fruit slicing mechanism capable of rapid operation permitting large quantities of fruit to be sliced, and when operating upon prepared fruit, such as apples from which the skins have been removed, to cut the latter into perfect rings by insuring the "righting" of the apple with its cored aperture in a circular position before the fruit is brought into engagement with the slicing knives.

To these and other ends the invention consists in certain improvements and combinations of parts all as will be hereinafter more fully described, and novel features being pointed out in the claims at the end of the specification.

Figure 1:
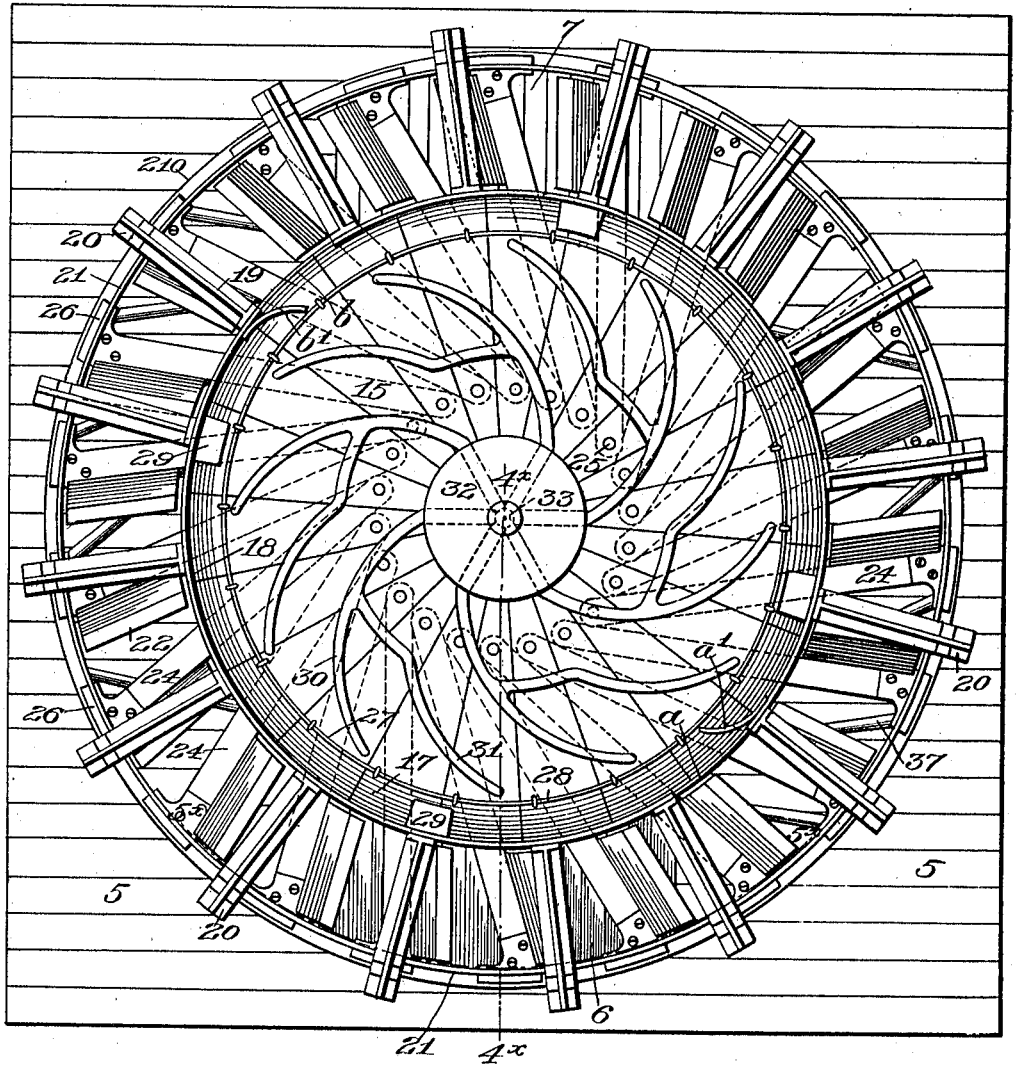
Figure 2:
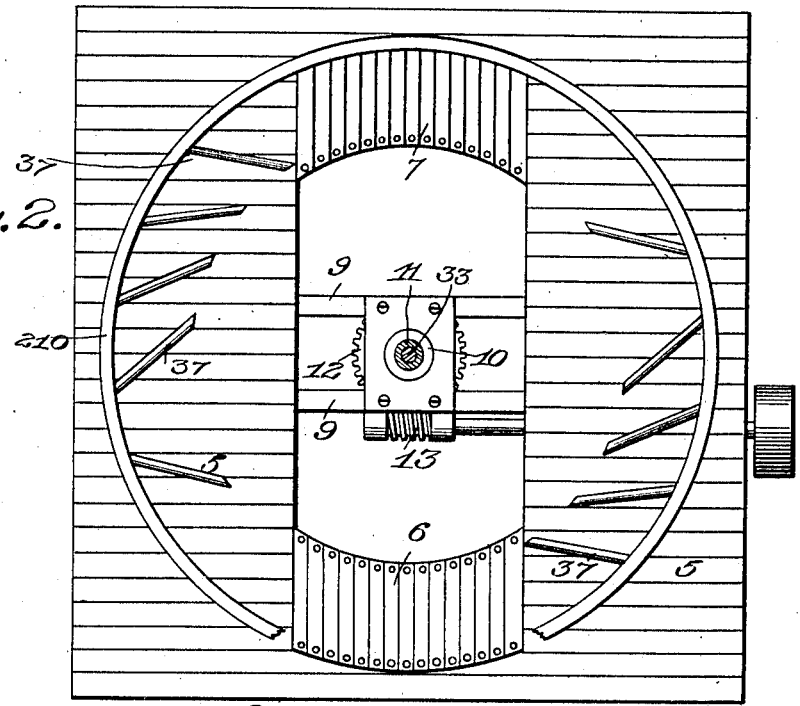
Figure 3:
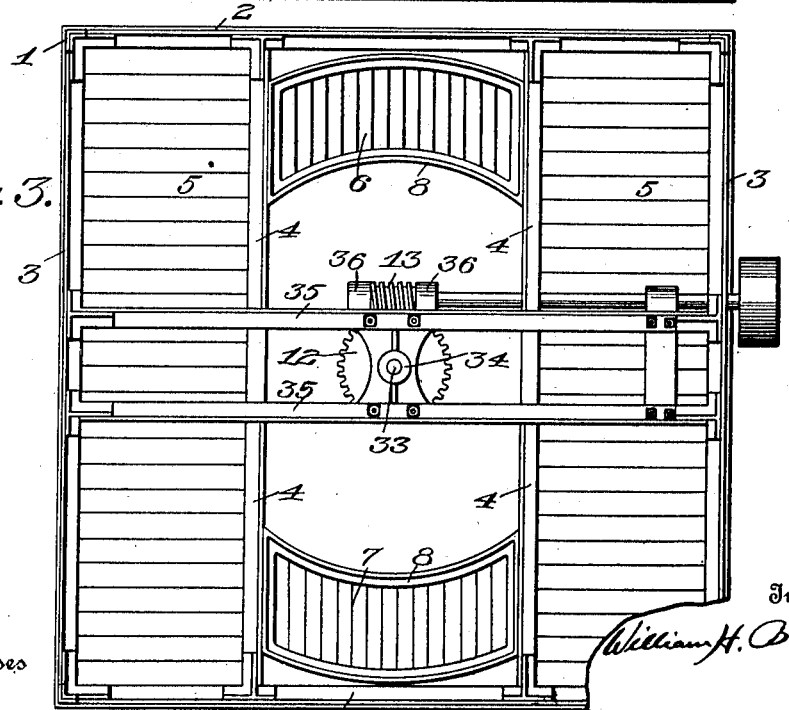

In the drawings: Figure 1 is a top plan view of a fruit slicing machine constructed in accordance with my present invention; Fig. 2 is a top plan view of the slicing table, the superposed sweeps and the revolving distributing head being removed; Fig. 3 is a bottom plan view of the slicing table; Fig. 4 is an enlarged detail section taken on the line 4ˣ—4ˣ of Fig. 1; Fig. 5 is an enlarged sectional view taken on the line 5ˣ—5ˣ of Fig. 1, and Fig. 6 is a detail sectional view. Similar reference numerals in the several figures indicate the same parts.

In carrying out my present invention I provide a horizontal table or support on which one or more sets of slicing knives are arranged, preferably at opposite sides of the table, above which and located centrally thereof is a hopper having a revoluble bottom. The latter comprises a disk or turntable rotating about a horizontal axis and provided around its outer edge with a plurality of sweeps, which engage the pieces of fruit and carry them into engagement with the slicing knives. The disk or turntable in itself constitutes a platform on which the fruit to be sliced is deposited and from which the separate pieces of fruit are permitted to pass outwardly through openings in the surrounding hopper wall or guard rail, and to drop into the pockets between the sweeps as these successively rotate past said apertures, a fruit being carried into engagement with the latter partly by the centrifugal force imparted to it and partly by stationary guide members or arms overlying the platform.

The slicing machine illustrated as one embodiment of the invention may be described more specifically as comprising the table legs 1 supporting the top of the table which is bounded by the side rails 2—2, 3—3. Extending transversely between the rails 2 are cross-bars 4—4 and between the latter and the side rails 3 extends the flooring composed of boards 5. At opposite sides of the table, gangs or sets of inclined slicing knives are arranged, as indicated by 6 and 7, each set of knives being mounted in a frame 8, as shown particularly in Fig. 5, which is secured at the outer edge of the table by bolting or otherwise connecting it at its ends to the faces of the cross-bars 4. Also extending across the under side of the table top are other cross-bars 9—9, carrying a center bearing 10 in which is journaled a tubular shaft 11 which is adapted to be rotated by any suitable source of power, in the present instance by the gear wheel 12 driven by the worm 13. The upper end of the shaft 11 projects above the top of the slicing table and is provided with a hub having the horizontal projecting flange 14 to which the turntable 15 is rigidly secured.

The diameter of the turntable or disk is such that its outer edge overhangs the inner ends of the cutting knives, as shown in Fig. 4. It is preferably made of tapered radially extending pieces of wood secured at their inner ends to the flange 14 of the hub and connected together at their outer extremities by blocks 16 attached to their under sides and overlapping the joints between the adjacent pieces of which the table is composed. The outer edge of the latter is beveled, as indicated at 17, and extending above this edge is a stationary guard flange or circular rail 18 forming the hopper wall which is supported independently of the turntable 15 by means of a plurality of arms 19 attached to its outer surface and having downwardly extending ends 20 fastened to the top of the table. The inner edges of the portions 20 of the brackets are vertical and serve as a means of support for the circular rim or curb 21 which extends upwardly from the top of the slicing table and is disposed concentrically to the disk 15 and its rail 18, but is of such a diameter as to embrace the outer ends of the separate sets of cutting knives. Arranged within the circular space, bounded on the outer side by the curb 21 and on the inner side by the periphery of the turntable 15, is located a plurality of sweeps or pushers which are preferably arranged equidistantly, each comprising a head 22 disposed with its forward or operative face 23 at an angle to the slicing table, its upper edge projecting in advance of its bottom edge in position to hold the fruit engaged by it against the face of the table, and to crowd it downwardly as successive slices are removed by the slicing knives. Each of these heads are mounted upon a bar 24 which projects inwardly between the adjacent edges of two of the blocks 16, and is secured at its inner end by a bolt 25 to the flange 14 of the hub. At the outer end of each of the bars 24 is a supporting finger 26 riding upon the upper surface of the lower portion of the boundary rail indicated by 210, the latter being preferably made of upper and lower parts arranged to form a slot between them as shown.

The turntable or disk is further provided with means for causing the fruit deposited thereon to travel toward its outer edge, and when once in this position to be transported, while in engagement with the rail 18, to the point or points of discharge, which latter are indicated in Fig. 1, by $a$, $b$, and consist of openings in the rail 18. In proximity to each discharge aperture and preferably at the rear edges of these openings are curved fingers $a'$ $b'$, which project inwardly over the beveled edge 17 of the turntable, and serve as means which act in conjunction with the disk to direct or discharge the pieces of fruit in a lateral direction under the influence of the movement imparted to them by the continuous movement of the disk when said pieces engage the fingers. The turntable is also provided with a circular rib 27 preferably located at the point formed by the angle of the surface 17 and need only be of sufficient height to prevent a fruit from attempting to travel upwardly on the incline 17 when it engages one of the deflecting fingers $a'$ or $b'$ or when said fruit is the rearmost one of a series of pieces which may attempt to crowd each other through one of the discharge apertures. In practice this rib may be made of wire and secured to the disk or turntable at various points by staples 28. In order to prevent frictional engagement of the fruit with the rail 18 from retarding their progress, the turntable is provided at various points with projections 29 which cause the fruit to be advanced in the direction of movement of the turntable. These are preferably wedge shape adapting them to be fitted at various points on the surface 17, but of such a size that their upper edges do not project above the face of the turntable 15. The length of the bevel surface between two adjacent blocks or feeding projections 29 determines the number of pieces of fruit which can be fed successively into the pockets between the sweeps or pusher heads 22, and by increasing or decreasing the numbers of these projections I have found by practice that two or more, or only one fruit, may be fed into each pocket.

The prepared fruit is deposited in bulk promiscuously on the disk or turntable 15 or fed thereto in quantities in any suitable manner, and coöperating therewith I employ means for preventing the fruit from revolving *en masse* with the turntable, but permitting its movement to act upon the separate pieces of fruit and causing them to eventually reach the depressed transporting edge of the disk. In carrying out this object of my invention I arrange above the turntable and in contact therewith a plurality of curved arms 30, disposed with their forward edges extending outwardly and rearwardly in the direction of movement of the turntable to the end that the underlying pieces of the mass of fruit contacting therewith will be arrested while the rotating face of the turntable will cause them to roll and travel outwardly until they finally tumble into the depression formed by the bevel 17. These arms may also be provided with additional projections, as indicated by 31, and may be detachably secured beneath a stationary head 32 connected to the pin 33 extending downwardly through the shaft 11 and supported at its lower end in a bracket 34 carried on cross rails 35, said bracket also having the arm 36 in which the worm 13 is journaled.

The openings $a$, $b$ through which the fruit is delivered to the sweep pockets are arranged at points which, considered in the direction of movement of the sweeps, lie in rear of, or beyond the sets of knives which, it will be observed, provides considerable space through which the fruit may be moved before it is brought into engagement with a set of knives. The path of movement thus provided, which the fruit must traverse, is utilized to allow the fruit to position itself with its cored aperture extending vertically. To facilitate this operation automatically the surface of the table in proximity to the apertures $a$, $b$ is provided with a plurality of ribs or shoulders 37 which are preferably flattened, forming broadened shoulders, and producing the effect of a grooved or corrugated surface which will cause the separate pieces of fruit to roll and turn one way or another until each of them finally comes to a position of rest on one of its ends which is more or less flattened by the previous paring operation. These grooves may be formed in a variety of ways, but in practice I prefer to use a plurality of rib pieces, as shown, arranged at various angles to each other and to the circular path of movement of the sweeps, as only a few of them are required, and a fruit when once "righted" will usually remain in this position while being advanced over the remaining flat surface of the table into engagement with the slicing knives, which then cut the fruit into perfectly formed rings.

The pushers or sweeps constitute a conveyer, and the latter traveling past the discharge aperture of the hopper receives the single pieces of fruit ejected therefrom, and may of course be employed simply as a means of distributing the fruit or carrying it away from the hopper without operating in conjunction with the slicing knives.

I claim as my invention:

1. In a distributing mechanism, the combination with a stationary platform, of a revoluble turntable on which articles are deposited, sweeps movable over the platform, and means for directing said articles outwardly from the turntable into the path of the sweeps.

2. In a distributing mechanism, the combination with a stationary platform, of a revoluble turntable, sweeps moving therewith and traversing the platform, and means for causing articles deposited on the platform to be directed into the path of the sweeps.

3. In a distributing mechanism, the combination with a horizontal platform, of a circular revoluble turntable, sweeps surrounding the turntable and traveling therewith over the platform, and means arranged stationary relatively to and coöperating with the turntable for directing articles placed thereon into the path of the sweeps.

4. In a machine of the character described, the combination with a table, of a circular turntable, sweeps surrounding the turntable and traveling over the stationary table, a wall rising above the turntable having an opening and means for causing articles deposited on the platform to pass out of said opening into the path of the sweeps.

5. In a distributing mechanism for fruit handling machines, the combination with a horizontal table, two stationary curbs spaced apart and forming a path between them, and sweeps traversing said path, of a turntable revolving within the inner curb its rotary movement acting to distribute single pieces of fruit placed upon it in alinement against and carry them along the face of the inner curb, said curb having an opening through which pieces of fruit may pass laterally into the path of the sweeps.

6. A fruit distributing mechanism for slicing machines comprising a turntable, sweeps traversing it, a hopper consisting of a stationary circular wall provided with an opening at one side of the path of the sweeps and a rotatable bottom.

7. The combination with a table, of a hopper arranged above the table having a circular wall provided with a discharge opening, a rotatable bottom in the hopper acting on articles deposited thereon to eject them from the opening, and a plurality of sweeps traversing the table in a plane beneath the said discharge opening.

8. In a distributing mechanism, the combination with a hopper having a circular wall provided with a discharge opening, a rotatable bottom in the hopper acting on articles deposited thereon to eject them from the opening, and transporting devices receiving and carrying said articles when ejected from said opening.

9. In a distributing mechanism, the combination with a circular hopper wall provided with a discharge opening, of a revoluble hopper bottom having an inclined portion adjacent said hopper wall, and transporting devices rotating in a circular path around the hopper and adapted to receive articles passing out of the hopper.

10. The combination with a circular hopper wall having a laterally opening discharge aperture, of a hopper bottom located beneath the aperture and adapted to be rotated continuously in one direction, and a plurality of pockets movable successively past the discharge aperture and traveling in the direction of movement of the hopper bottom.

11. The combination with a horizontal table, of a rotatable disk located above the table having the edge of its upper face depressed, a circular wall extending upwardly above said edge and provided with an aperture, and a guide for deflecting articles on the disk extending inwardly at one side of said aperture, sweeps movable over the table and passing in proximity to said aperture, means adapted to coöperate with articles placed on the disk for preventing them from rotating *en masse* on the disk, but permitting said articles to pass to the edge of the disk and be carried by it and ejected through the aperture in said wall.

12. The combination with transporting devices, of a hopper having a circular wall provided with an aperture arranged to discharge into the path of the transporting devices, a rotatable bottom in the hopper having a portion of its face adjacent the hopper wall adapted to transport articles to the discharge aperture from various points about the periphery of the hopper, and means stationary within the hopper adapted to coöperate with articles deposited on the hopper bottom within said edge from rotating with the bottom and means for revolving the latter.

13. In a fruit handling mechanism, the combination with a support, means for transporting fruit comprising a plurality of pockets, of a rotatable disk, a circular rim having a discharge opening arranged in juxtaposition to said transporting means, said disk having an edge operating to carry fruit to the discharge opening, means overlying the central portion of the disk within the edge for impelling fruit placed thereon in an outward direction into a position on said edge and means for deflecting fruit in a lateral direction through the opening in the rim.

14. In a distributing mechanism, the combination with a rotatable disk on which articles may be placed, means for revolving it and a wall bounding the disk having a discharge opening, of means overlying the central portion of the disk permitting the movement thereof to agitate the articles but retarding them from traveling with said portion of the disk, said means being arranged to provide a free surface adjacent said wall for receiving articles and transporting them to the discharge opening, a device for deflecting the articles through said opening and a movable conveyer passing said opening and adapted to receive articles ejected therefrom.

15. In a mechanism for distributing articles, the combination with a rotatable turntable having a major central portion on which the articles may be placed surrounded by an annular edge portion provided with a plurality of spaced projections, of an annular wall extending above said edge of the disk and provided with a discharge opening, a guide at one side of the opening projecting inwardly and adapted to direct articles out of said opening when carried into contact with the guide by the movement of the disk and a movable conveyer arranged in juxtaposition to and located beneath the discharge opening.

16. In a mechanism for distributing articles, the combination with a revoluble platform having a central portion adapted to receive a plurality of articles in bulk surrounded by an annular transporting edge, of means for causing said articles to arrange themselves in alinement on said edge by the movement imparted to them by the rotation of the platform, an annular wall retaining them in position on the platform having a discharge opening, and means adapted to engage the articles and guide them laterally out of said opening, their lateral movement being also effected by the movement transmitted to them by the platform when said articles are engaged by the guiding means.

17. In a mechanism for distributing articles deposited in bulk into single order, the combination with a movable surface adapted to receive a plurality of articles *en masse*, said surface having an edge portion and means coöperating with the mass of articles to cause them by reason of the movement imparted by the movable surface to assume positions in alinement with each other on the edge of said surface, a wall along which the alined articles are carried having an opening and means coöperating with each article as it approaches said opening to direct it laterally therethrough.

18. In a fruit handling mechanism, the combination with a table, fruit pushers moving thereover, and a plurality of ribs on the table arranged in the path of the pushers and adapted to coöperate with the fruit to cause it to assume a position of rest upon one of its flattened ends, of a rotatable platform located above the plane of the pushers and adapted to receive fruit deposited thereon in bulk, and means coöperating with the platform for discharging separate pieces of fruit therefrom singly into the path of the pushers.

19. In a fruit handling mechanism, the combination with a rotatable platform adapted to receive articles of fruit, sweeps arranged in spaced relation traversing a circular path surrounding the platform and a table underlying the sweeps, of a retaining rim around the platform provided with discharge apertures opening into the path of the sweeps at opposite sides of the platform, and deflecting members arranged relatively to each of said apertures for directing fruit carried on the platform out of said apertures.

20. In a fruit handling mechanism, the combination with a rotatable disk, and transporting devices attached to and extending outwardly from the disk beneath its upper face, of a stationary curb inclosing the transporting devices, a similar curb rising above the face of the disk provided with a discharge aperture, said disk being provided with a depressed edge in proximity to the last mentioned curb and adapted to hold articles in engagement therewith and a deflecting finger at the rear side of said aperture projecting inwardly from the edge of the disk.

21. In a fruit handling mechanism, the combination with a rotatable disk and a bearing hub therefor having a flange secured to the underside of the disk, of arms attached to the flange and projecting outwardly beyond the disk, their outer ends forming transporting devices, inner and outer annular curbs at opposite sides of the path of said transporting devices, the inner curb being provided with an aperture leading from the face of the disk into the path of said transporting devices, and brackets attached to and supporting the inner curb.

22. In a fruit handling mechanism, the combination with a rotatable disk and transporting members attached to the disk and extending outwardly therefrom, of a center bearing, a tubular shaft journaled therein and connected to the disk, a stationary member extending through the shaft, a plurality of arms attached to the member and overlying the face of the disk, a flange surrounding the latter having an aperture, and means for directing articles carried on the disk out of said aperture into the path of the transporting members.

WILLIAM H. BOUTELL.

Witnesses:
LUCY A. BOUTELL,
G. WILLARD RICH.

---

Copies of this patent may be obtained for five cents each, by addressing the " Commissioner of Patents, Washington, D. C."